US012421661B2

(12) United States Patent
Egan, III

(10) Patent No.: US 12,421,661 B2
(45) Date of Patent: Sep. 23, 2025

(54) SLURRY CLEANER SYSTEMS WITH CLEANER DILUTION DEVICES AND METHODS OF CLEANING SLURRIES THEREWITH

(71) Applicant: Kadant Black Clawson LLC, Lebanon, OH (US)

(72) Inventor: John J. Egan, III, Centerville, OH (US)

(73) Assignee: Kadant Black Clawson LLC, Lebanon, OH (US)

( * ) Notice: Subject to any disclaimer, the term of this patent is extended or adjusted under 35 U.S.C. 154(b) by 282 days.

(21) Appl. No.: 17/773,164

(22) PCT Filed: Nov. 9, 2020

(86) PCT No.: PCT/US2020/059632
§ 371 (c)(1),
(2) Date: Apr. 29, 2022

(87) PCT Pub. No.: WO2021/101742
PCT Pub. Date: May 27, 2021

(65) Prior Publication Data

US 2023/0357989 A1 Nov. 9, 2023

Related U.S. Application Data

(60) Provisional application No. 62/939,253, filed on Nov. 22, 2019.

(51) Int. Cl.
*B04C 5/14* (2006.01)
*B04C 5/23* (2006.01)
*D21D 5/24* (2006.01)

(52) U.S. Cl.
CPC ................ *D21D 5/24* (2013.01); *B04C 5/14* (2013.01); *B04C 5/23* (2013.01)

(58) Field of Classification Search
CPC ................ B04C 5/13; B04C 5/14; B04C 5/23
See application file for complete search history.

(56) References Cited

U.S. PATENT DOCUMENTS 3,337,050 A * 8/1967 Labecki .................... B04C 5/14 209/731

FOREIGN PATENT DOCUMENTS

CA 2234238 A1 4/1998
EP 3018252 A1 5/2016
(Continued)

OTHER PUBLICATIONS

Japanese Office Action dated Oct. 2, 2024, pertaining to JP Patent Application No. 2022-523587, 8 pgs.
(Continued)

*Primary Examiner* — Bradley R Spies
(74) *Attorney, Agent, or Firm* — Dinsmore & Shohl LLP

(57) ABSTRACT

A cleaner system for removing solid debris and contaminants from a feed slurry includes a cleaner operable to separate a feed slurry into an accepted slurry and a reject slurry, the reject slurry including the solid debris and contaminants. The cleaner system further includes a dilution device fluidly coupled to a reject outlet of the cleaner. The dilution device includes a dilution water hydrocyclone having a dilution water inlet, a cyclonic flow section, an underflow outlet at a downstream end of the cyclonic flow section, and a reject slurry inlet in a top of the dilution water hydrocyclone. The dilution water hydrocyclone further includes a flow director disposed between the dilution water inlet and the reject slurry inlet and operable to direct the flow of dilution water from the dilution water inlet in at least an axial direction towards the cyclonic flow section.

20 Claims, 7 Drawing Sheets

(56) References Cited

FOREIGN PATENT DOCUMENTS

| | | | |
|---|---|---|---|
| JP | 1958009007 | B | 10/1956 |
| JP | 2008539339 | A | 11/2008 |
| WO | 9927177 | A1 | 6/1999 |

OTHER PUBLICATIONS

India Patent Office; Examination Report for India Patent Application Serial No. 202217032757, 6 pgs.; Dec. 21, 2022.
International Search Report and Written Opinion dated Feb. 26, 2021, pertaining to Int'l Patent Application No. PCT/US2020/059632, 12 pgs.
European Patent Office; Communication 161(1) and 162 EPC; Application No. 20816829.4-1016; Jun. 29, 2022; 3 pgs.
Japanese Office Action dated Feb. 5, 2025, pertaining to JP Patent Application No. 2022-523587, 6 pgs.
Chinese Office Action dated Dec. 7, 2024, pertaining to CN Patent Application No. 202080079511.0, 28 pgs.

* cited by examiner

SLURRY CLEANER SYSTEMS WITH CLEANER DILUTION DEVICES AND METHODS OF CLEANING SLURRIES THEREWITH

CROSS-REFERENCE TO RELATED APPLICATIONS

This application is a National Phase Entry under 35 U.S.C. § 371 of International Patent Application No. PCT/US2020/059632, filed Nov. 9, 2020, which claims of the benefit of priority to U.S. Provisional Application No. 62/939,253, entitled "Slurry Cleaner Systems with Cleaner Dilution Devices and Methods of Cleaning Slurries Therewith," filed Nov. 22, 2019, the entire contents of both of which are hereby incorporated by reference in the present disclosure.

BACKGROUND

Field

The present specification generally relates to cleaner systems for removing solid debris and contaminants from slurries, in particular, hydrocyclonic cleaner systems having dilution devices and methods of cleaning slurries using the cleaner systems.

Technical Background

Many industries include preparation and processing of slurries. For example, in the paper industry, processes for making paper require production of pulp, which is a slurry comprising a solid suspension of fibers, such as cellulose fibers or other fibers in water. Depending on the source of the fibers, the pulp can include various concentrations and sizes of solid contaminants such as wood fragments, fiber bundles, metal pieces, hardened adhesive, sand, or other contaminants. For example, increasing use of recycled paper as a source of the fibers may increase the presence of hardened adhesives, metal fragments, sand, and wood fragments in the pulp. Slurries in other industries may have other types of solid debris and/or contaminants. These solid contaminants can decrease the quality of the slurry and/or cause disruptions in downstream processes.

Before further processing slurries, such as before introducing the pulp to the paper-making process, the slurry is generally "cleaned" to remove these solid debris and/or contaminants from the slurry. Cleaning the slurry can be accomplished by introducing the slurry to a cleaning system that includes at least one hydrocyclonic cleaner. The cyclonic fluid flow produced by the hydrocyclone can cause greater-density solid contaminants and debris to flow outward through centrifugal forces to the outer wall of the hydrocyclone while the lesser-density cleaned slurry migrates towards the center. The cleaned slurry exits from an accepted slurry outlet of the hydrocyclone while the greater-density solid debris and contaminants travel down the outer wall towards a reject outlet. Thus, the lesser-density slurry leaving the hydrocyclonic cleaner from the overflow outlet may be substantially free of solid debris and contaminants. The solid debris and contaminants pass out of the hydrocyclonic cleaner as part of a reject slurry.

SUMMARY

Hydrocyclonic cleaners can be susceptible to pugging at an underflow outlet where the reject slurry is passed out of the hydrocyclone due to the higher slurry consistency resulting from the high centrifugal forces in the hydrocyclone and greater concentration of solid debris and contaminants in the reject slurry. Dilution water can be added to the reject slurry proximate the underflow outlet of the hydrocyclone. However, turbulent mixing caused by introducing the dilution water proximate the underflow outlet can cause at least a portion of the solid debris and/or contaminants to reverse flow back up into the hydrocyclone cleaner and possibly into the flow of the lesser-density slurry. This can reduce the separation efficiency of the hydrocyclone cleaner and result in possible breakthrough of solid debris and/or contaminants to downstream processes.

Accordingly, an ongoing need exists for cleaner systems for removing solid debris and/or contaminants from a slurry. In particular, ongoing needs exist for cleaner systems having dilution devices that are capable of reducing plugging of the reject outlet of the hydrocyclonic cleaner while reducing or preventing re-introduction of portions of the solid debris and/or contaminants back into the cleaner. The cleaner systems of the present disclosure include a cleaner and a dilution device coupled to the reject outlet of the cleaner. The dilution device may include a dilution water hydrocyclone having a flow director disposed between a reject slurry inlet and a dilution water inlet. The flow director may direct the dilution water to establish a cyclonic flow pattern before contacting the dilution water with the reject slurry. The flow director may also restrict flow of dilution water directly from the dilution water inlet to the reject slurry inlet and may space apart contact between the dilution water and the reject slurry from the reject slurry inlet, thereby reducing or preventing re-introduction of solid debris and/or contaminants back into the upstream cleaner.

According to one or more aspects of the present disclosure, a cleaner system for removing solid debris and contaminants from a feed slurry may include a cleaner operable to separate a feed slurry into an accepted slurry and a reject slurry. The reject slurry may include at least a portion of the solid debris and contaminants from the feed slurry. The cleaner system may further include a dilution device disposed downstream of the cleaner and fluidly coupled to a reject outlet of the cleaner. The dilution device may include a dilution water hydrocyclone. The dilution water hydrocyclone may include a dilution water inlet and a cyclonic flow section downstream of the dilution water inlet. The cyclonic flow section may have an upstream end and a downstream end. The dilution water hydrocyclone may further include an underflow outlet disposed at the downstream end of the cyclonic flow section, a reject slurry inlet disposed in a top of the dilution water hydrocyclone and coupled to a reject slurry outlet of the cleaner, and a flow director disposed between the dilution water inlet and the reject slurry inlet. The flow director may be operable to direct the flow of dilution water from the dilution water inlet in at least an axial direction towards the cyclonic flow section.

According to one or more additional aspects, a method of removing solid debris and contaminants from a feed slurry may include introducing the feed slurry to a cleaner operable to produce a cyclonic flow that separates the feed slurry into a reject slurry and an accepted slurry. The reject slurry may include at least a portion of the solid debris and contaminants. The method may further include passing the reject slurry to a dilution water hydrocyclone fluidly coupled to a reject outlet of the cleaner. The dilution water hydrocyclone may include a cyclonic flow section, a dilution water inlet upstream of an upstream end of the cyclonic flow section, a reject slurry inlet upstream of the upstream end of the cyclonic flow section, an underflow outlet at a downstream end of the cyclonic flow section, and a flow director disposed between the reject slurry inlet and the dilution water inlet. The method may further include introducing dilution water to the dilution water hydrocyclone through the dilution water inlet. Introducing the dilution water causes the dilution water to establish a cyclonic flow in an annular flow region defined between the flow director and an inner surface of the dilution water hydrocyclone. The method may further include contacting the dilution water with the reject slurry at an outlet end of the flow director. Contacting the dilution water with the reject slurry may cause at least a portion of the dilution water to mix with the reject slurry to reduce or prevent plugging of the cleaner, the dilution device, or both.

It is to be understood that both the foregoing general description and the following detailed description describe various embodiments and are intended to provide an overview or framework for understanding the nature and character of the claimed subject matter.

BRIEF DESCRIPTION OF THE DRAWINGS

The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
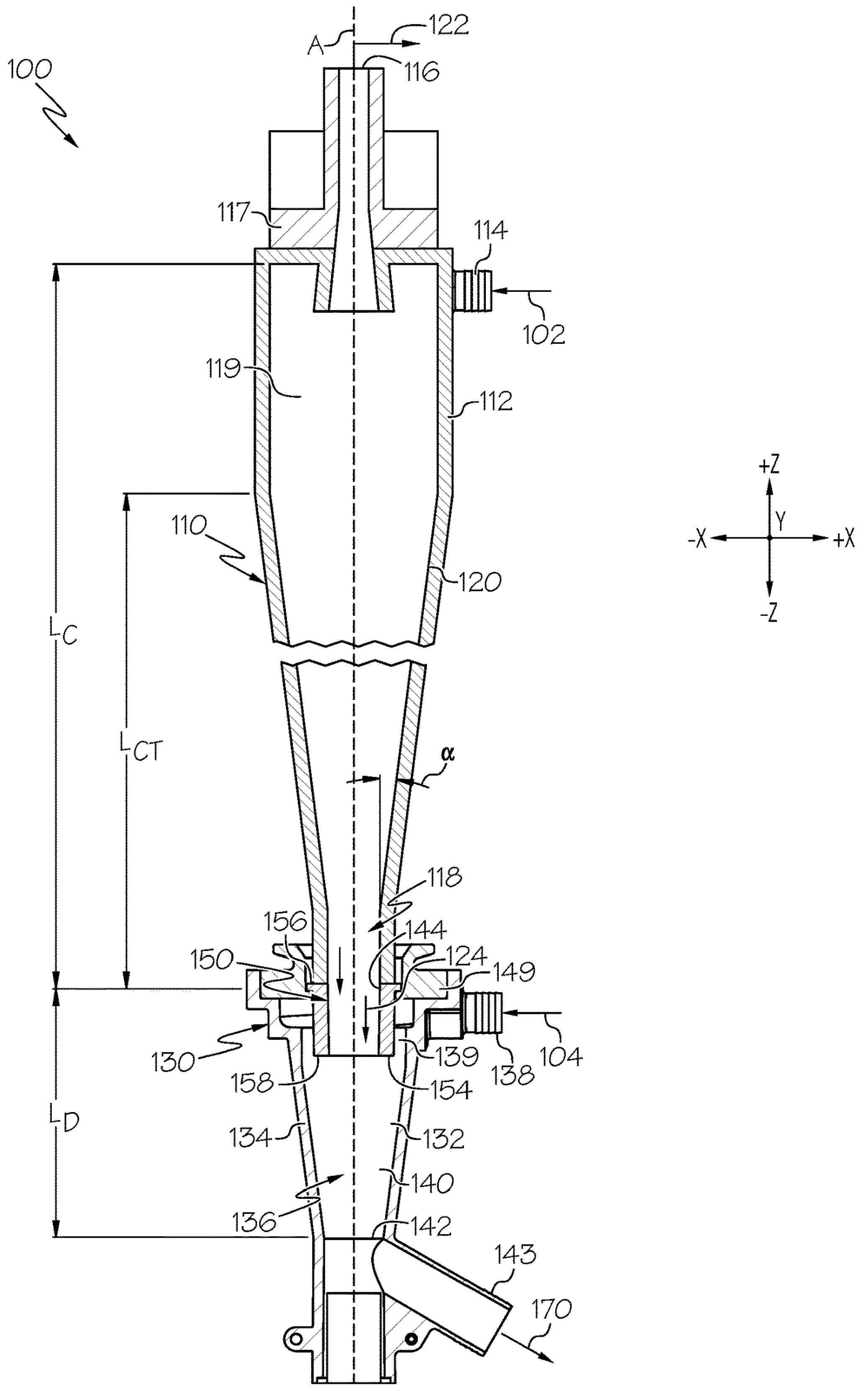
FIG. 1 schematically depicts a front cross-sectional view of a cleaner system, according to one or more embodiments shown and described herein.

Reference will now be made in detail to embodiments of cleaner systems according to the present disclosure. Whenever possible, the same reference numerals will be used throughout the drawings and the detailed description to refer to the same or like parts. Referring to FIG. 1, an embodiment of a cleaner system 100 for removing solid debris and contaminants from a feed slurry 102 is schematically depicted. The cleaner system 100 includes a cleaner 110 operable to separate the feed slurry 102 into an accepted slurry 122 and a reject slurry 124, the reject slurry 124 comprising at least a portion of the solid debris and contaminants from the feed slurry 102. The cleaner system 100 further includes a dilution device 130 disposed downstream of the cleaner 110 and fluidly coupled to a reject outlet 118 of the cleaner 110. The dilution device 130 may comprise a dilution water hydrocyclone 132 that can include a dilution water inlet 138 tangent to the dilution water hydrocyclone 132 and a cyclonic flow section 140 having an upstream end proximate to the dilution water inlet 138 and a downstream end downstream of the upstream end. The dilution water hydrocyclone 132 may further include an underflow outlet 142 disposed at the downstream end of the cyclonic flow section 140, a reject slurry inlet 144 disposed in a top portion 149 of the dilution water hydrocyclone 132 and coupled to the reject outlet 118 of the cleaner 110, and a flow director 150 disposed between the dilution water inlet 138 and the reject slurry inlet 144. The flow director 150 may be operable to direct the flow of dilution water 104 from the dilution water inlet 138 in at least an axial direction downstream towards the cyclonic flow section 140.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Directional terms as used herein—for example up, down, right, left, front, back, top, bottom—are made only with reference to the figures as drawn and the coordinate axis provided therewith and are not intended to imply absolute orientation.

As used herein, the singular forms “a,” “an” and “the” include plural referents unless the context clearly dictates otherwise. Thus, for example, reference to “a” component includes aspects having two or more such components, unless the context clearly indicates otherwise.

As used herein, the terms “longitudinal” and “axial” may refer to an orientation or direction generally parallel with the center axis A of the dilution device 130, which may be parallel with a +/−Z direction of the coordinate axis in the Figures.

As used herein, the term “radial” may refer to a direction along any radius, which extends outward from the center axis A of the dilution device 130.

As used herein, the term “angular” may generally refer to a direction of increasing or decreasing angle about the center axis A of the dilution device 130.

As used herein, the term “solid contaminant” or “solid debris” may refer to solid objects, such as wood fragments, metal pieces, dried adhesives, sand, or other contaminants, that are not intended to be and not desired in the accepted slurry and may be distinguished from the solid constituents that are intended to be in the solid suspension, such as fibers for example.

As used herein, the term "consistency" may refer to the solids content of a slurry and may be defined as a weight ratio of the weight of solids in the slurry to the total weight of the slurry.

As used herein, the terms "upstream" and "downstream" refer to the positioning of components or units of the cleaner systems relative to a direction of flow of materials through the cleaner systems. For example, a first component may be considered "upstream" of a second component if materials flowing through the cleaner system encounter the first component before encountering the second component. The first component may be considered "downstream" of the second component if the materials encounter the second component before encountering the first component. For the dilution device 130, "upstream" and "downstream" are relative to the axial flow of the reject slurry through the dilution device 130 from the reject slurry inlet 144 to the underflow outlet 142.

Hydrocyclonic cleaners have been used to remove solid debris and contaminants from slurries. In particular, hydrocyclonic cleaners have been used to remove solid debris and contaminants from fiber slurries in the pulp and paper industry. The cleaner systems disclosed herein will be described in the context of removing solid debris and/or contaminants from fiber slurries in the pulp and paper applications; however, it is understood that the cleaner systems of the present disclosure may be used in other industries, such as but not limited to, food and beverage, textiles, oil and gas, chemical processing, construction, engineered wood, plastics and rubber processing, or other industries.

Hydrocyclonic cleaners include a hydrocyclone and operate by generating a cyclonic flow within a cylindrical portion or tapered portion of the hydrocyclone. The cyclonic flow may generate centrifugal forces that cause greater density components, such as solid debris or solid contaminants, to migrate radially outward towards the walls of the hydrocyclone, while the lesser-density components are displaced radially inward towards the center of the hydrocyclone. Hydrocyclonic cleaners may be through-flow or reverse-flow hydrocyclonic separators. In through-flow hydrocyclonic separators, the incoming slurry may be introduced tangentially to the hydrocyclone at one end of the hydrocyclonic separator, and both the greater density reject stream and the accepted slurry stream exit from the opposite end of the hydrocyclone, with the greater density reject stream flowing proximate the walls of the hydrocyclone and the accepted slurry stream exiting from the center. The accepted slurry stream may be isolated from the greater density reject stream with a tube, sometimes referred to as a vortex finder, inserted into the outlet of the hydrocyclone. Examples of through-flow hydrocyclonic cleaners can be found in U.S. Pat. No. 5,769,243, the entire contents of which are incorporated by reference herein.

Some hydrocyclonic cleaners may include reverse-flow hydrocyclones in which the greater-density reject stream exits from an underflow outlet of the hydrocyclone and a lesser-density accepted slurry exits from an overflow outlet on an end of the hydrocyclone opposite the underflow outlet. In a reverse flow hydrocyclone, the greater-density constituents migrate towards the wall and flow generally downward along the walls of the hydrocyclone. The lesser-density constituents may be displaced towards the center of the hydrocyclone and may reverse flow to flow generally upwards towards the overflow outlet. Further examples of reverse-flow hydrocyclonic cleaners can be found in U.S. Pat. No. 5,938,926, the entire contents of which are incorporated by reference herein. Other types of slurry cleaners may also be used to separate solid debris and/or contaminants from slurries.

Regardless of the type of cleaner used, whether a through-flow hydrocyclonic cleaner, a reverse-flow hydrocyclonic cleaner, or other type of cleaner, the greater-density reject slurry produced by the cleaner generally can have a high concentration of solids. In some cases, the fiber consistency and concentration of solids in the reject stream can be great enough to cause plugging in the reject outlet or in piping or conduits downstream of the reject outlet. This plugging may restrict flow of the greater-density reject stream out of the cleaner. The flow restriction may cause solid debris and contaminants from the reject slurry to get reintroduced to the accepted slurry, which may carry this solid debris and/or contaminants to downstream processes. Debris and contaminants in downstream processes can cause problems, such as plugging nozzles or other problems. When plugging of a reject outlet is identified, the hydrocyclonic cleaner must be taken off-line and the reject outlet and downstream conduits and piping cleared before resuming operation of the cleaner. This can result in lost productivity of the cleaner system.

Plugging can be reduced or prevented by adding dilution water to the reject slurry. Dilution water can be added to the reject slurry in one of two methods. In the first method, the dilution water may be fed axially and upward into the reject outlet of the cleaner via a dilution water tube inserted into the reject slurry proximate the reject outlet of the cleaner. The discharge end of the tube will typically be located somewhere in a zone that starts just downstream the reject outlet and finishes just upstream of the reject outlet, where upstream and downstream are relative to the axial direction of flow of the reject slurry. The diluted reject slurry can be collected in a reject chamber through which the dilution tube extends and generally leaves in a radial or tangential manner.

In the second method, the dilution water may be fed into a cylindrical/conical dilution chamber immediately downstream from the reject outlet of the cleaner hydrocyclone. In this method, the dilution water generally begins to mix with the reject slurry at the reject outlet. In both of these methods, introduction of the dilution water to the reject slurry poses a significant risk that the turbulence caused by the dilution mixing will disrupt the flow of some of the rejected contaminants and carry them upward and back into the accepted slurry flow. The dilution water may contact the reject slurry before cyclonic flow of the dilution water can be established, thereby increasing both the non-circumferentiality and general non-uniformity of the mixing process.

Therefore, there is a need for dilution devices that are operable to introduce dilution water to the reject stream from the cleaner hydrocyclone without causing turbulent flow to carry solid debris and contaminants back into the cleaner and into the accepted slurry. Referring to FIG. 1, the cleaner system 100 for removing solid debris and contaminants from a feed slurry 102 according to the present disclosure is depicted. The cleaner system 100 may include a cleaner 110 and a dilution device 130 coupled to a reject outlet 118 of the cleaner 110. The dilution device 130 may be a dilution water hydrocyclone 132 that includes a flow director 150 that at least partially restricts flow between the dilution water inlet 138 and the reject slurry inlet 144. The flow director 150 of the dilution device 130 may allow the cyclonic flow of dilution water 104 to become established in the dilution device 130 before the dilution water 104 mixes with the reject slurry 124. In the mixing zone, the axial component of the velocity of the cyclonic flow of dilution water 104 may operate to carry the reject slurry 124 further downward into the cyclonic flow section 140, which may reduce or prevent the turbulence in the mixing zone from causing solid debris and/or contaminants from passing back upward through the reject slurry inlet 144 into the cleaner 110.

Referring to FIG. 1, the cleaner system 100 may include a cleaner 110. The cleaner 110 may be a through-flow or reverse-flow hydrocyclone cleaner. In one or more embodiments, the cleaner 110 may be a reverse flow hydrocyclone cleaner. The cleaner 110 may include a body 112, which may be an elongated hollow body. The body 112 may include a tapered section 120 extending over a substantial portion of the length $L_C$ of the body 112. In some embodiments, the tapered section 120 may have an axial length $L_{CT}$ that is greater than or equal to 50%, greater than or equal to 60%, or even greater than or equal to 70% of the length $L_C$ of the body 112. In some embodiments, the tapered section 120 may extend along the entire length $L_C$ of the body 112. In one or more embodiments, the body 112 may include an inlet chamber 119 upstream of the tapered section 120. The inlet chamber 119 may be a portion of the cleaner 110 into which the feed slurry 102 is initially introduced through a slurry inlet 114. The inlet chamber 119 may be a cylindrical inlet chamber or a frusto-conical inlet chamber.

The tapered section 120 may be frusto-conical in shape having a wider end and a narrower end, where the wider end has a greater diameter than the narrower end. The wider end may be disposed at an upstream end of the tapered section 120, and the narrower end may be disposed downstream of the wider end. The narrower end may be a downstream end of the tapered section 120. The wider end of the tapered section 120 may be coupled to and in fluid communication with the inlet chamber 119. The tapered section 120 may be defined by a cone angle $\alpha$ and the axial length $L_{CT}$. The tapered section 120 may have a length-to-diameter ratio sufficient to induce annular acceleration in the flow of the feed slurry 102 as the slurry moves down the cleaner 110. The tapered section 120 may have a length-to-diameter ratio of greater than or equal to 20:1, or greater than or equal to 23:1. The tapered section 120 may have a cone angle $\alpha$ of less than 3°.

Referring again to FIG. 1, the body 112 of the cleaner 110 may include a slurry inlet 114. The slurry inlet 114 may be coupled to the body 112 at the inlet chamber 119 or to the tapered section 120 proximate the wider end of the tapered section 120. The slurry inlet 114 may enter from the side of the body 112 and may be configured to introduce the feed slurry 102 to the cleaner 110 in a manner that creates the cyclonic flow in the cleaner 110. In embodiments, the slurry inlet 114 may be a tangential slurry inlet. In other words, the slurry inlet 114 may be tangent to an inner surface of the body 112. In one or more embodiments, the slurry inlet 114 may be coupled to the body 112 so that the slurry inlet 114 is generally parallel with a plane that is tangent to the inner surface of the body 112. The term tangent is intended to include slight variations from tangent, such as along a plane angled less than 10 degrees or less than 5 degrees from tangent or a plane parallel to tangent but radially offset from tangent by less than 10% of a diameter of the slurry inlet 114. In embodiments, the slurry inlet 114 may be oriented along a line forming a non-zero angle with a plane tangent to the inner surface of the body 112, such as an angle greater than 0 degrees and less than 90 degrees.

The cleaner 110 may include an overflow outlet 116 in a top portion 117 of the cleaner 110 and a reject outlet 118 at the narrower end of the tapered section 120. The overflow outlet 116 may include an open-ended conduit or tube that extends at least partially into the cleaner 110. The open-ended conduit may reduce or prevent the feed slurry 102 introduced to the cleaner 110 from flowing directly into the overflow outlet 116 without being subjected to the cyclonic flow within the cleaner 110. The reject outlet 118 of the cleaner 110 may be positioned at the narrower end of tapered section 120. In one or more embodiments, the reject outlet 118 may have a cross-sectional area that is equal to or greater than a cross-sectional area of the overflow outlet 116.

Referring to FIG. 1, the cleaner 110 may be operable to separate the feed slurry 102 into an accepted slurry 122 and a reject slurry 124. The feed slurry 102 may be introduced to the cleaner 110 through the slurry inlet 114. The orientation of the slurry inlet 114 relative to the body 112 of the cleaner 110 may cause the feed slurry 102 to flow along the inner surface of the body 112 to create a cyclonic flow pattern. In embodiments, the slurry inlet 114 may be tangential to the body 112 of the cleaner 110, which may cause the feed slurry 102 to be introduced tangentially to the cleaner 110. At the tapered section 120, the cross-sectional area of the cleaner 110 decreases, which may angularly accelerate the feed slurry 102 in the cyclonic flow and generate greater centrifugal forces within the feed slurry 102. The increased centrifugal forces caused by the angular acceleration of the feed slurry 102 in the tapered section 120 may cause solid debris and contaminants of the feed slurry 102 to travel radially outward towards the inner surface of the body 112 and may cause the acceptable portions of the feed slurry 102, such as but not limited to water and fibers, to travel radially inward towards the center axis A of the cleaner 110. The acceptable portions of the feed slurry 102 may include water, fibers, diluents, and other constituents having densities less than the solid debris and contaminants.

The solid debris and contaminants may travel in a primary vortex flow along the inner surface of the body 112 in the tapered section 120 downstream towards the reject outlet 118 (i.e., in the −Z direction of the coordinate axis of FIG. 1). The accepted slurry 122 may form a secondary vortex at the center of the cleaner 110. The secondary vortex may create flow of the accepted slurry 122 in a direction opposite the primary vortex flow (i.e., in a +Z direction of the coordinate axis in FIG. 1). The secondary vortex may create flow of the accepted slurry 122 towards the overflow outlet 116 of the cleaner 110. The reject slurry 124 comprising the solid debris and/or contaminants may exit the cleaner 110 from the reject outlet 118. The accepted slurry 122 may exit the cleaner 110 from the overflow outlet 116.

Referring again to FIG. 1, as previously discussed, the cleaner system 100 may further include the dilution device 130, which may be fluidly coupled to the reject outlet 118 of the cleaner 110. The dilution device 130 may include a dilution water hydrocyclone 132 that includes a body 134 defining an internal volume 136. The dilution water hydrocyclone 132 may further include a dilution water inlet 138, an inlet section 139, a cyclonic flow section 140, an underflow outlet 142, a reject slurry inlet 144, and a flow director 150. Each of these features of the dilution device 130 will be further discussed herein. As shown in FIG. 1, the dilution device 130 may be coupled to the cleaner 110 such that the reject slurry inlet 144 of the dilution device 130 is fluidly coupled to the reject outlet 118 of the cleaner 110.

Figure 2:
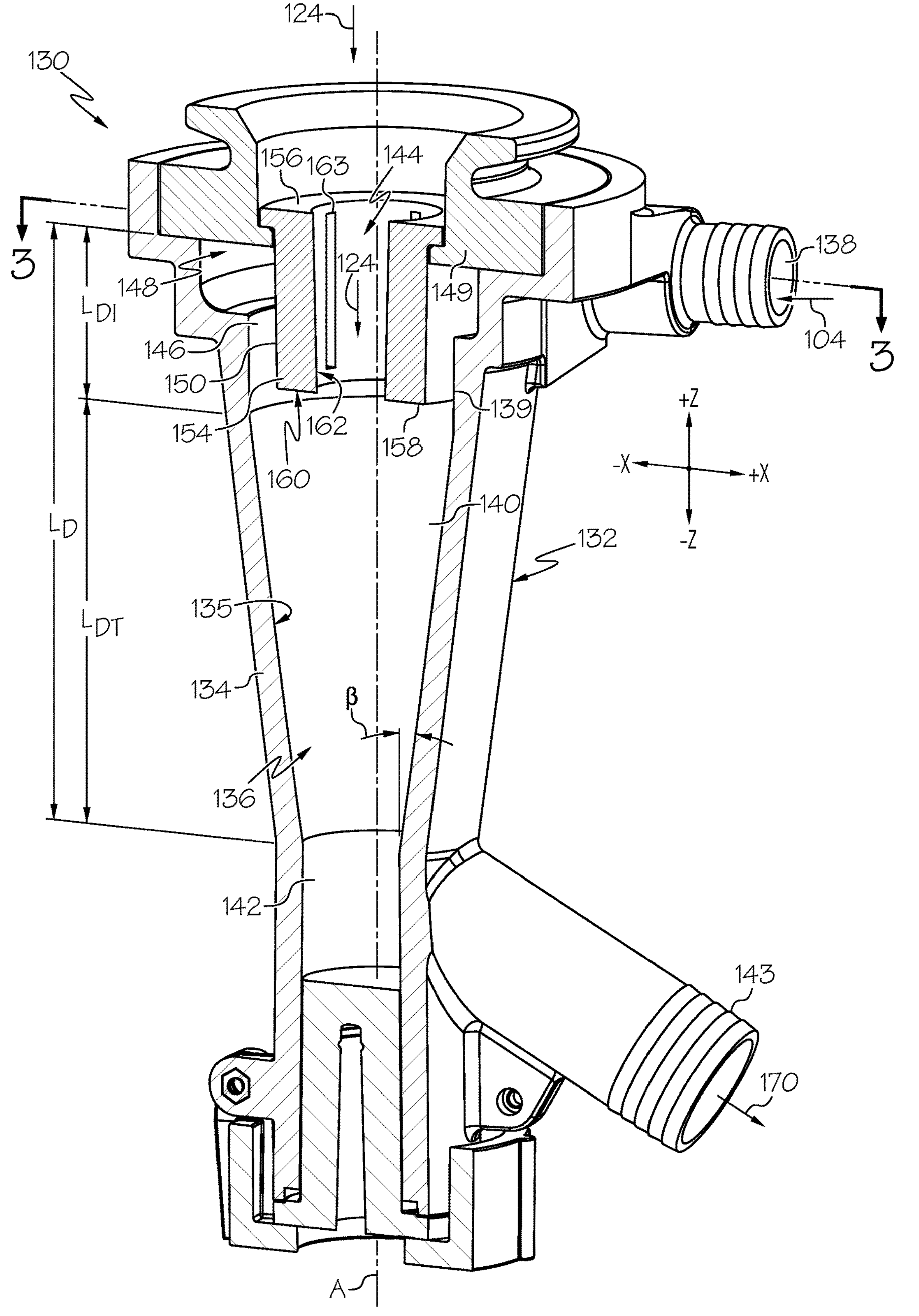
FIG. 2 schematically depicts a front cross-sectional view of a dilution device of the cleaner system of FIG. 1, according to one or more embodiments shown and described herein.

Referring to FIG. 2, the body 134 may have an inner surface 135 that defines the internal volume 136 of the dilution water hydrocyclone 132. The body 134 may be formed from a material that is resistant to abrasion by the solid debris or contaminants passed through the dilution device 130. Materials suitable for the body 134 may include, but are not limited to, ceramic materials, metals or metal alloys, or polymers/plastics, or other materials. In one or more embodiments, the body 134 may be a ceramic body. In embodiments, the body 134 may be a plastic or polymeric body.

Referring again to FIG. 2, the inlet section 139 may be disposed in a top portion of the dilution device 130 proximate the dilution water inlet 138 and the reject slurry inlet 144. The inlet section 139 may be a portion of the dilution water hydrocyclone 132 in which the flow of dilution water 104 transitions from generally linear flow at the dilution water inlet 138 to cyclonic flow downstream of the dilution water inlet 138. The inlet section 139 may extend from the reject slurry inlet 144 downward (i.e., in the −Z direction of the coordinate axis of FIG. 2) towards the cyclonic flow section 140. The inlet section 139 may be a cylindrical inlet section or a frustoconical inlet section. The inlet section 139 may be in fluid communication with the dilution water inlet 138. In one or more embodiments, the inlet section 139 may include an inlet channel 148 that may be an annular channel extending from the dilution water inlet 138 around the periphery of the inlet section 139 in an angular and slightly axial direction. The inlet channel 148 may be defined by a portion of the inner surface 135 of the body 134 that extends radially outward from the center axis A relative to the inner surface 135 in the remaining portions of the inlet section 139. The inlet channel 148 may be operable to facilitate development of the cyclonic flow pattern of the dilution water 104 in the inlet section 139 of the dilution water hydrocyclone 132.

Referring to FIGS. 1 and 2, the dilution water inlet 138 may be in fluid communication with the inlet section 139 and may be disposed in the side of the body 134 at the inlet section 139. The dilution water inlet 138 may be configured to introduce the dilution water 104 to the dilution device 130 in a manner that causes the dilution water 104 to flow around the inner surface 135 of the body 134 to develop the cyclonic flow in the dilution device 130. The dilution water inlet 138 may be tangent to the body 134 of the dilution water hydrocyclone 132, may be radial relative to the body 134 of the dilution water hydrocyclone 132, or may be disposed at a horizontal angle of from greater than zero degrees to less than 90 degrees relative to a radial line extending radially outward from the center axis A of the dilution water hydrocyclone 132. In embodiments, the dilution water inlet 138 may be oriented tangent to the inner surface 135 of the body 134 in the inlet section 139. The dilution water inlet 138 may be a tangential inlet. In embodiments, the dilution water inlet 138 may be coupled to or incorporated into the body 134 so that the dilution water inlet 138 is generally parallel with a plane that is tangent to the inner surface of the body 134 in the inlet section 139. The term tangent is intended to include slight variations from tangent, such as along a plane angled less than 10 degrees or less than 5 degrees from tangent or a plane parallel to tangent but radially offset from tangent by less than 10% of a diameter of the dilution water inlet 138. In embodiments, the dilution water inlet 138 may be oriented to introduce the dilution water 104 radially inward into the inlet section 139. In embodiments, the dilution water inlet 138 may be oriented at an angle between the radial and tangential orientations. The dilution water inlet 138 may be fluidly coupled to a source (not shown) of dilution water 104. The dilution water inlet 138 may be generally perpendicular to the vertical direction (i.e., the +/−Z axis of the coordinate axis in FIG. 2) or may be angled slightly in the axial direction (i.e., may form an angle with a plane perpendicular to the +/−Z axis of FIG. 2). With respect to the orientation of the dilution water inlet 138, "angled slightly" may refer to an angle less than 5 degrees, or even less than 3 degrees, between the centerline of the dilution water inlet 138 and a plane perpendicular to the Z axis of FIG. 2. The dilution water inlet 138 may be positioned to produce cyclonic flow of the dilution water 104 that is clockwise or counterclockwise. In other words, the dilution water inlet 138 may be positioned so that an angular component of the cyclonic flow is clockwise or counter clockwise for the dilution water 104 in the inlet section 139. In embodiments, the cyclonic flow of the dilution water 104 may have an angular direction opposite the angular direction of the cyclonic flow of the reject slurry 124.

Referring to FIGS. 1 and 2, the reject slurry inlet 144 may be disposed in the top portion 149 of the body 134. The reject slurry inlet 144 may be axially oriented and may be centered on the center axis A of the dilution device 130 and/or the cleaner 110. As previously discussed, the reject slurry inlet 144 may be fluidly coupled to the reject outlet 118 of the cleaner 110. The reject slurry inlet 144 may be operable to receive the reject slurry 124 from the reject outlet 118 of the cleaner 110 and pass the reject slurry 124 in an axial direction downward (i.e., in the −Z direction of the coordinate axis of FIG. 2) into the inlet section 139 of the dilution device 130. The reject slurry inlet 144 may be large enough to allow the reject slurry 124 to flow downward along the sidewalls of the cleaner 110 into the dilution device 130 while also allowing for an air core and/or reverse flow of accepted slurry 122 to flow upwards (i.e., in the +Z direction) in a center of the reject slurry inlet 144 back into the cleaner 110.

Referring again to FIG. 2, the cyclonic flow section 140 may extend from the inlet section 139 in a direction downward (i.e., in the −Z direction of the coordinate axis of FIG. 2) towards the underflow outlet 142. The cyclonic flow section 140 may be cylindrical or tapered and may have an upstream end and a downstream end. As shown in FIG. 2, in embodiments, the cyclonic flow section 140 may be tapered, such as having a frustoconical shape in which the upstream end has an inner dimension (e.g., diameter) greater than an inner dimension (e.g., diameter) of the downstream end. In other embodiments, the cyclonic flow section 140 may be cylindrical in shape with both the upstream end and downstream end having similar or equal inner dimensions. The upstream end of the cyclonic flow section 140 may be oriented proximate the inlet section 139 and the downstream end may terminate in the underflow outlet 142. The dilution device 130 may have an overall length $L_D$, which is the distance from the reject slurry inlet 144 to the underflow outlet 142. The cyclonic flow section 140 may have a length $L_{DT}$, which is the distance between the upstream end and the downstream end of the cyclonic flow section 140. The length $L_{DT}$ of the cyclonic flow section 140 may be greater than or equal to 50% of the overall length $L_D$ of the dilution device 130, such as greater than or equal to 60%, or even greater than or equal to 70% of the overall length $L_D$ of the dilution device 130. When the cyclonic flow section 140 is tapered, the cyclonic flow section 140 may have a taper angle β determined as an angle between the inner surface 135 of the body 134 in the cyclonic flow section 140 and a plane perpendicular to the center axis A. The cyclonic flow section 140 of the dilution device 130 may have a taper angle β of greater than or equal to 0 (zero) degrees and less than or equal to 10 degrees, such as greater than 0 degrees and less than or equal to 7 degrees, or greater than 0 degrees and less than or equal to 5 degrees.

Referring to FIG. 2, the dilution device 130 includes the underflow outlet 142 disposed at the downstream end of the cyclonic flow section 140. The underflow outlet 142 may be operable to pass the diluted reject slurry 170 out of the cyclonic flow section 140 of the dilution device 130. The underflow outlet 142 may be generally axial and centered on the center axis A of the dilution device 130. In some embodiments the underflow outlet 142 may be fluidly coupled to a discharge conduit 143, which may extend radially outward (i.e., in the +X direction of the coordinate axis in FIG. 2) and downward (i.e., in the −Z direction) from the underflow outlet 142. The discharge conduit 143 may be operable to pass the diluted reject slurry 170 out of the dilution device 130 to one or more downstream processes for further processing of the diluted reject slurry 170.

Figure 3:
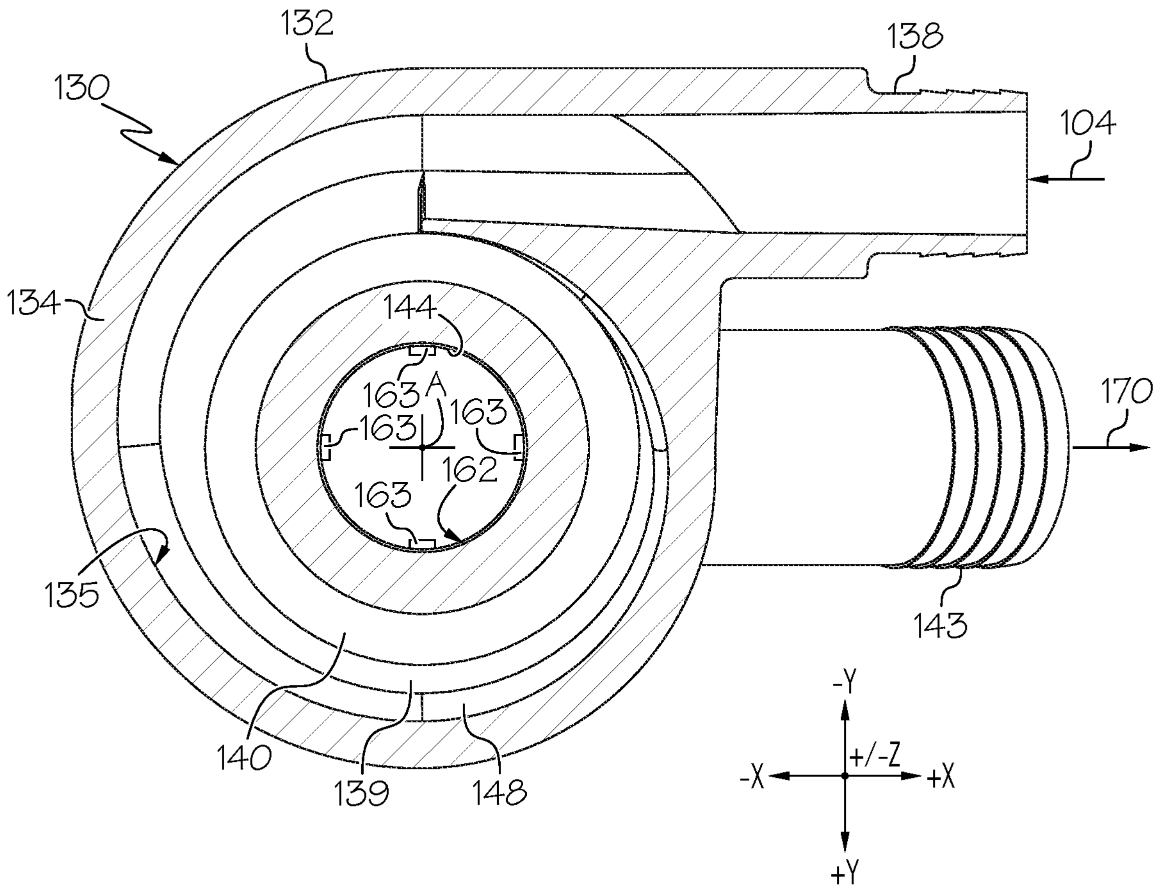
FIG. 3 schematically depicts a top cross-sectional view of the dilution device of FIG. 2 taken along reference line 3-3, according to one or more embodiments shown and described herein.

Referring again to FIGS. 2 and 3, as previously discussed, the dilution device 130 may include the flow director 150 disposed in the inlet section 139 of the dilution device 130. The flow director 150 may be a hollow tube. The flow director 150 may comprise a flow director wall 154 that is a continuous wall forming the hollow tube. The flow director 150 may have an inlet end 156 and an outlet end 158. The inlet end 156 may be coupled to the body 134 proximate the reject slurry inlet 144 and may be in fluid communication with the reject slurry inlet 144. The inlet end 156 may be an open end to enable the reject slurry 124 to pass into the flow director 150. At the inlet end 156 of the flow director 150, the flow director wall 154 may circumscribe the reject slurry inlet 144 so that the reject slurry 124 passing into the dilution device 130 through the reject slurry inlet 144 passes into flow director 150 (i.e., passes into the elongated hollow tube defined by the inner surface 162 of the flow director wall 154). The outlet end 158 may be disposed at an end of the flow director 150 opposite the inlet end 156 and may be disposed vertically below (i.e., in the −Z direction) and downstream of the inlet end 156. The outlet end 158 of the flow director 150 may be an open end to enable the reject slurry 124 passing through the flow director 150 to pass into the inlet section 139 and the cyclonic flow section 140 of the dilution device 130. The inlet end 156 and the outlet end 158 may have any cross-sectional shape, such as circular, polygonal, oval, or irregular-shaped. In one or more embodiments, the inlet end 156 and the outlet end 158 may have a circular cross-sectional shape.

Figure 4:
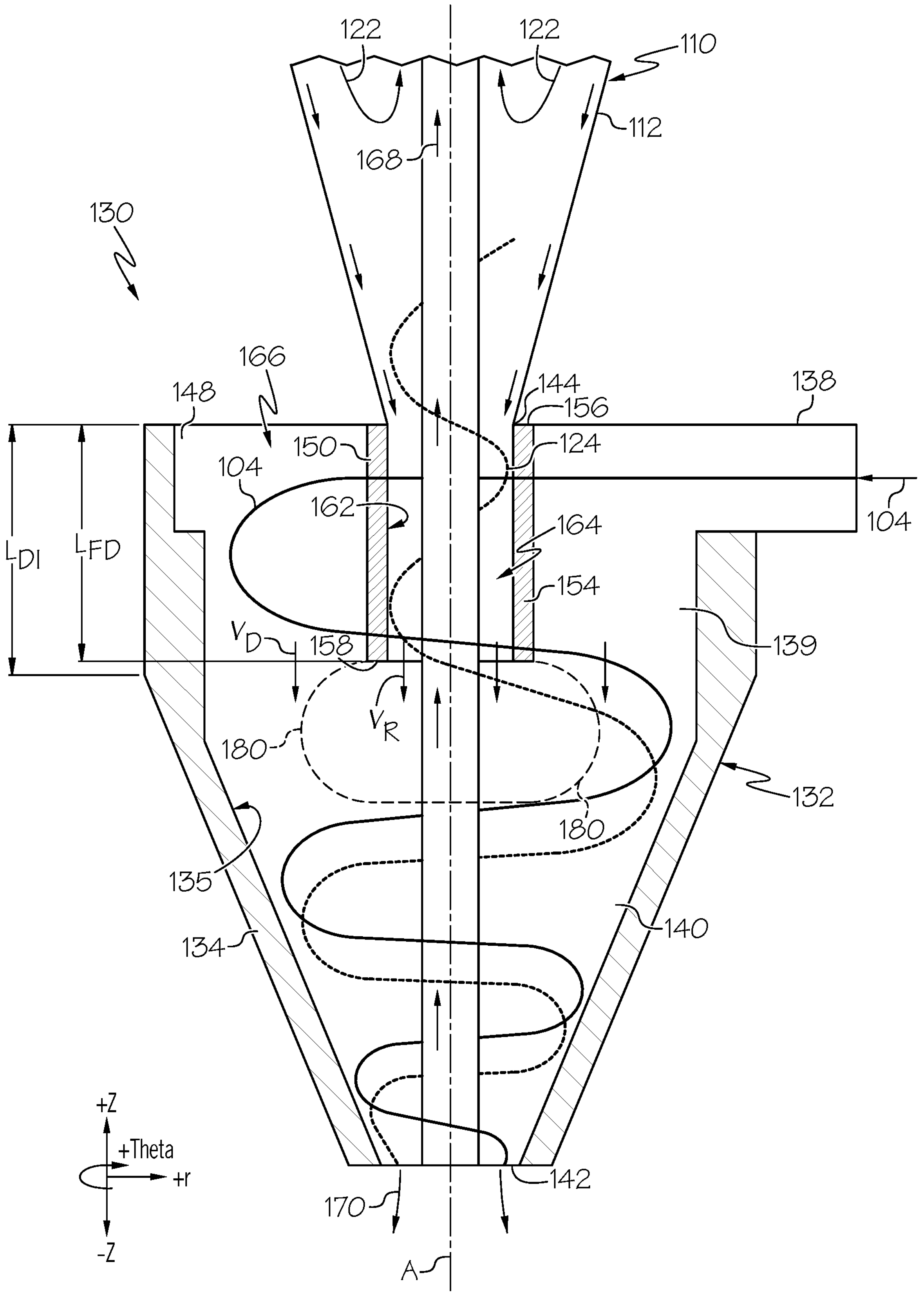
FIG. 4 schematically depicts operation of one embodiment of a dilution device, according to one or more embodiments shown and described herein.

The flow director wall 154 may be cylindrical or frustoconical. The flow director wall 154 may extend from the top portion 149 of the body 134 downward (i.e., in the −Z direction of the coordinate axis of FIG. 2) into the inlet section 139. Referring to FIG. 4, the flow director wall 154 may have an axial length $L_{FD}$, which is the distance between the inlet end 156 and the outlet end 158 of the flow director 150. The axial length $L_{FD}$ of the flow director wall 154 may be sufficient for the dilution water 104 to establish a cyclonic flow pattern before mixing with the reject slurry 124 passing through the flow director 150. The axial length $L_{FD}$ of the flow director wall 154 may be greater than or equal to 50% of an axial length $L_{DI}$ of the inlet section 139, where the axial length $L_{DI}$ of the inlet section 139 is the distance between the top portion 149 of the inlet section 139 and the upstream end of the cyclonic flow section 140. The axial length $L_{FD}$ of the flow director wall 154 may be greater than or equal to 60%, greater than or equal to 70%, greater than or equal to 80%, or even greater than or equal to 90% of the axial length $L_{DI}$ of the inlet section 139.

The outlet end 158 of the flow director 150 may have an axial surface 160 facing generally downward (i.e., in the −Z direction of the coordinate axis in FIG. 2) towards the cyclonic flow section 140. The axial surface of the outlet end 158 may be a flat surface that is generally planar. At the outlet end 158, the axial surface 160 that is a flat surface may provide increased turbulence at the outlet end 158 of the flow director 150 compared to an axial surface 160 that is rounded or tapered. The increased turbulence at the outlet end 158 may help to mix the dilution water 104 with the reject slurry when the two flows are combined at the outlet end 158 of the flow director 150.

Referring again to FIGS. 2 and 3, an inner surface 162 of the flow director 150 may include one or more anti-rotation tabs 163 extending inward from the inner surface 162 of the flow director 150. The anti-rotation tabs 163 may be rectangular in shape with the longer dimension parallel to the center axis A so that the anti-rotation tabs extend axially (i.e., the +/−Z direction of the coordinate axis in FIG. 2) along the length $L_{FD}$ of the flow director 150. The anti-rotation tabs may be angularly spaced apart. In one or more embodiments, the anti-rotation tabs 163 may be spaced apart every 90 degrees.

In one or more embodiments, the flow director 150 may include a plurality of openings (not shown) in the flow director wall 154, which may allow at least a small portion of dilution water 104 to pass through into the hollow tube to mix with the reject slurry 124 upstream of the outlet end 158 of the flow director 150. In embodiments, the openings may be positioned proximate to the outlet end 158 of the flow director 150.

Referring to FIG. 4, the inner surface 162 of the flow director 150 may define a central flow region 164 through which the reject slurry 124 from the cleaner 110 passes from the reject slurry inlet 144 into the dilution water hydrocyclone 132. The outer surface of the flow director wall 154 and the inner surface 135 (FIG. 2) of the body 134 of the dilution water hydrocyclone 132 may define an annular flow region 166 therebetween. The annular flow region 166 may be in fluid communication with the dilution water inlet 138. The annular flow region 166 may include the inlet channel 148, when present. The annular flow region 166 may extend from the inlet end 156 to the outlet end 158 of the flow director 150. At the outlet end of the flow director 150, the annular flow region 166 may be in fluid communication with the cyclonic flow section 140 of the dilution water hydrocyclone 132.

The flow director 150 may be operable to at least partially or fully restrict flow of the dilution water 104 directly between the dilution water inlet 138 and the reject slurry inlet 144. At least partially or fully restricting the flow of dilution water 104 from the dilution water inlet 138 directly into the reject slurry inlet 144 may enable the cyclonic flow of the dilution water 104 to be established in the inlet section 139 of the dilution device 130 before contacting the dilution water 104 with the reject slurry 124 at the outlet end 158 of the flow director 150. As will be discussed further herein, restricting the flow of the dilution water 104 in the inlet section 139 may reduce or prevent re-introduction of solid debris and/or contaminants back into the cleaner 110 and/or re-entrainment of solid debris and contaminants from the reject slurry 124 back into the accepted slurry 122.

Referring now to FIGS. 1 and 4, in operation of the cleaner system 100, the cleaner 110 may operate to separate the feed slurry 102 into the accepted slurry 122 (FIG. 1) and the reject slurry 124. When the cleaner 110 is a hydrocyclonic cleaner, the reject slurry 124 passed out of the reject outlet 118 of the cleaner 110 may have a cyclonic flow pattern. The reject slurry 124 may be passed from the reject outlet 118 of the cleaner 110, through the reject slurry inlet 144, and into the central flow region 164 of the flow director 150. The reject slurry 124 may flow in a cyclonic flow through the flow director 150 to the outlet end 158 of the flow director 150. The cyclonic flow of the reject slurry 124 may have an angular component and an axial component. The angular component of the reject slurry 124 cyclonic flow may be clockwise (i.e., in the +theta direction of the cylindrical coordinate axis in FIG. 4) or counterclockwise (i.e., −theta direction of the cylindrical coordinate axis in FIG. 4) depending on the configuration of the cleaner 110. The axial component of the cyclonic flow of the reject slurry 124 in the flow director 150 may be generally downward (i.e., in the −Z direction of the cylindrical coordinate axis in FIG. 4). The cyclonic flow of the reject slurry 124 flowing through the central flow region 164 may be characterized by an axial velocity $V_R$ at the outlet end 158 of the flow director 150.

The flow through the flow director 150 may additionally include core flow 168 in which fluid may flow in reverse cyclonic flow upwards (i.e., in the +Z direction of the cylindrical coordinate axis of FIG. 4) through the dilution device 130 and the cleaner 110. The core flow 168 may be disposed in a center of the dilution device 130 such as along the center axis A of the dilution device 130. In one or more embodiments, the core flow 168 may include air or other gas entering from the underflow outlet 142 and passing upward through the dilution device 130. Alternatively or additionally, the core flow 168 may include a lesser density fluid, which may comprise lesser density constituents from the dilution device 130, such as water and any acceptable fibers or other acceptable constituents of the slurry.

Referring again to FIG. 4, the dilution water 104 may be introduced to the dilution device 130 through the dilution water inlet 138. The flow rate of the dilution water 104 may be sufficient to dilute the reject slurry 124 to reduce plugging of the dilution water hydrocyclone 132, in particular plugging of the cyclonic flow section 140 and/or the underflow outlet 142 of the dilution water hydrocyclone 132. The volumetric flow rate of the dilution water 104 may be sufficient to reduce the consistency of the reject slurry 124, which can have an initial consistency of up to 6% solids. A ratio of the volumetric flow rate of dilution water 104 to the volumetric flow rate of the reject slurry 124 passed into the dilution water hydrocyclone 132 may be from 0.45:1 to 1.55:1, from 0.75:1 to 1.25:1, or about 1:1. In one or more embodiments, the ratio of the volumetric flow rate of the dilution water 104 to the volumetric flow rate of the reject slurry 124 may be about 1:1.

The dilution water 104 may flow from the dilution water inlet 138 through the annular flow region 166 to the outlet end 158 of the flow director 150 in an angular direction and axially downward direction (i.e., in the −Z direction of the coordinate axis in FIG. 2). When the inlet section 139 of the dilution device 130 includes the inlet channel 148, the dilution water 104 may be directed by the inlet channel 148 to form the cyclonic flow pattern in the annular flow region 166. The angular component of the cyclonic flow of the dilution water 104 through the annular flow region 166 may be clockwise or counterclockwise. The angular component of the direction of flow of the dilution water 104 through the annular flow region 166 may be co-current or countercurrent to the angular direction of cyclonic flow of the reject slurry 124 through the central flow region 164. In embodiments, the angular component of the cyclonic flow of the dilution water 104 in the annular flow region 166 may be in an angular direction opposite the angular direction of the cyclonic flow of the reject slurry 124 in the central flow region 164. The axial component of the cyclonic flow of the dilution water 104 in the annular flow region 166 may be axially downward (i.e., in the −Z directions of the cylindrical coordinate axis of FIG. 4). The axial component of the cyclonic flow of dilution water 104 through the annular flow region 166 may be characterized by an axial velocity $V_{DW}$ at the outlet end 158 of the flow director 150.

At the outlet end 158 of the flow director 150, the cyclonic flow of the reject slurry 124 and the cyclonic flow of the dilution water 104 may contact one another. Contact of the flow of dilution water 104 with the reject slurry 124 may cause mixing between the dilution water 104 and the reject slurry 124. The mixing between the reject slurry 124 and the dilution water 104 may occur in a mixing zone 180 proximate the outlet end 158 of the flow director 150. Mixing of the dilution water 104 with the reject slurry 124 in the mixing zone 180 may produce a diluted reject slurry 170, which may continue in cyclonic flow downward (i.e., in the −Z direction) through the cyclonic flow section 140 of the dilution water hydrocyclone 132.

The mixing zone 180 may be spaced apart from the reject slurry inlet 144 by a distance due to the presence of the flow director 150. The distance may be equal to the length $L_{FD}$ of the flow director 150. By spacing the mixing zone 180 away from the reject slurry inlet 144 by the length $L_{FD}$, the flow director 150 may allow for establishment of the cyclonic flow of the dilution water 104 prior to contacting the dilution water 104 with the reject slurry 124 in the mixing zone 180. The established cyclonic flow of the dilution water 104 may result in a greater velocity component of the dilution water 104 in the −Z direction compared to introducing the dilution water 104 to the dilution device 130 without the flow director 150. This greater downward (−Z direction) axial velocity component of the dilution water may reduce or prevent the flow turbulence and turbulent mixing in the mixing zone 180 from causing a portion of the dilution water 104 from carrying a portion of the solid debris and/or contaminants back up through the reject slurry inlet 144 or into the core flow 168. Not intending to be bound by any particular theory, it is believed that the downward axial component of the velocity of the dilution water 104 ($V_D$) may cause the dilution water 104 to further convey the reject slurry 124 in the downward −Z direction, which is downstream away from the reject slurry inlet 144. Thus, the flow director 150 may improve the separation efficiency of the cleaner system 100.

If the length $L_{FD}$ is too small, the mixing zone 180 may be too close to the reject slurry inlet 144 and the axial component of the velocity of the dilution water 104 in the downward direction (−Z direction) may not be sufficient to continue to carry the reject slurry 124 downstream into the cyclonic flow section 140. This may result in the turbulent mixing causing the dilution water 104 to carry at least a portion of the solid debris and/or contaminants from the reject slurry 124 back into the reject slurry inlet 144. The probability of re-introducing the solids from the reject slurry 124 back into the cleaner 110 decreases with increasing length $L_{FD}$ of the flow director 150. Thus, increasing the length $L_{FD}$ of the flow director 150 can improve the separation efficiency of the cleaner system 150 by reducing re-introduction of solid debris and contaminants into the accepted slurry. However, if the length $L_{FD}$ is too large, the dilution water 104 may not be effective to reduce or prevent plugging of flow director 150 by the reject slurry 124, which may occur when the flow director 150 is excessively long. In one or more embodiments, the length $L_{FD}$ may be less than the length $L_{DI}$ of the inlet section 139 of the dilution water hydrocyclone 132.

Referring again to FIG. 4, as previously discussed, the reject slurry 124 may enter the mixing zone 180 at the outlet end 158 of the flow director 150 at the axial velocity of $V_R$ (i.e., axial component of the velocity in the −Z direction of the cylindrical coordinate axis in FIG. 4). The dilution water 104 may enter the mixing zone 180 at the outlet end 158 of the flow director 150 at the axial velocity of $V_D$. The ratio of $V_D/V_R$ may be sufficient for the dilution water 104 to continue to convey the reject slurry 124 downward (i.e., in the −Z direction of the coordinate axis in FIG. 4) into the cyclonic flow section 140. The ratio $V_D/V_R$ may be greater than or equal to 0.25, or even greater than or equal to 0.4. The ratio of $V_D/V_R$ may be less than or equal to 0.75, or even less than or equal to 0.6. The ratio of $V_D/V_R$ may be from 0.25 to 0.75, or from 0.4 to 0.6, or about 0.5. In some embodiments, $V_D$ may be half of $V_R$. If the velocity $V_D$ of the dilution water 104 is too great, the dilution water 104 may create too much turbulence in the mixing zone 180, which may cause an increase in re-entrainment of solid debris and/contaminants back into the accepted slurry 122. If the velocity $V_D$ of the dilution water 104 is too small, the dilution water 104 may not provide sufficient mixing with the reject slurry 124 to prevent plugging of the dilution water hydrocyclone 132.

Figure 5:
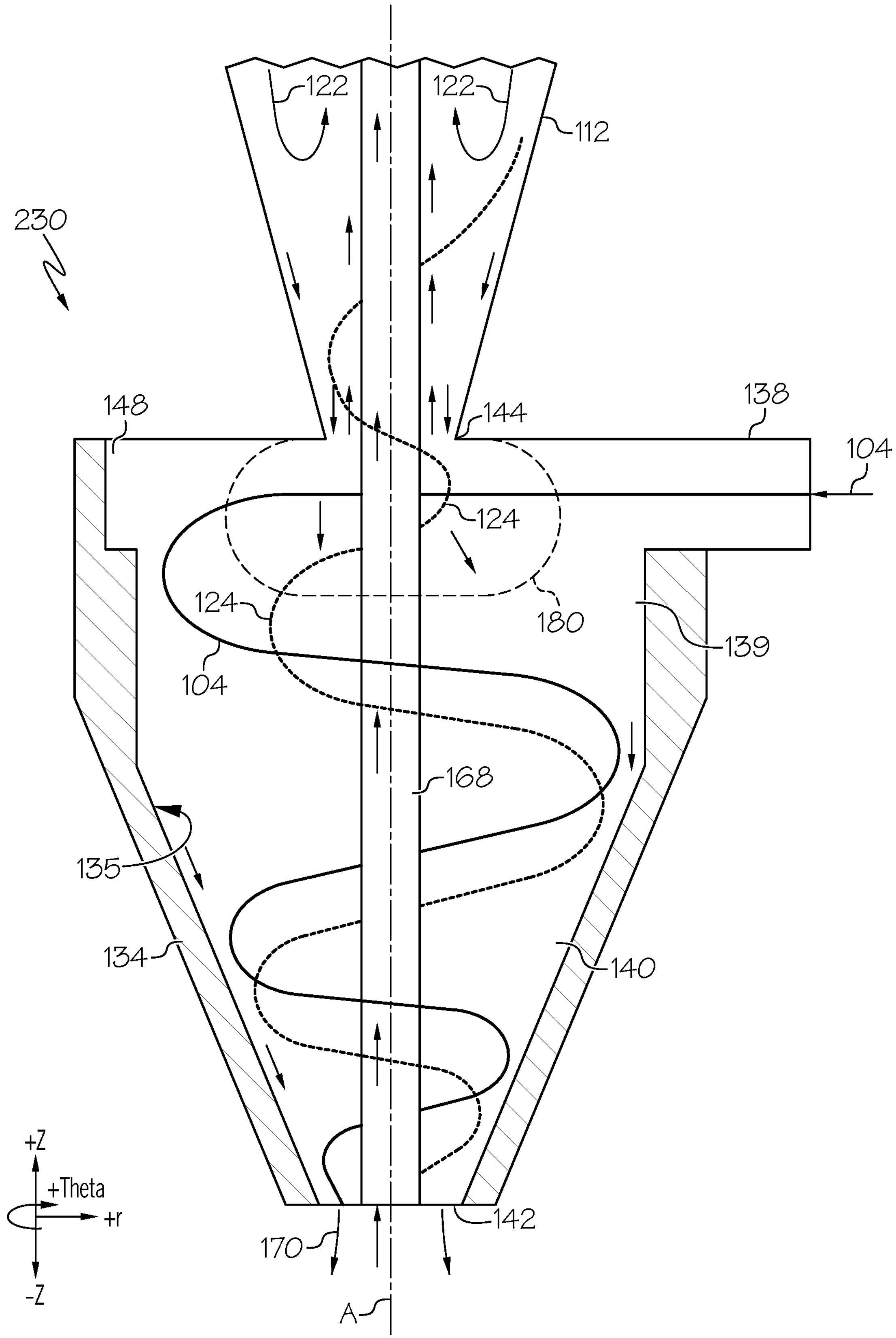
FIG. 5 schematically depicts operation of another embodiment of a dilution device, according to one or more embodiments shown and described herein.

Referring to FIG. 5, a dilution device 230 that does not have the flow director 150 is schematically depicted. Other than lacking the flow director 150, all other features of dilution device 230 are the same as those of the dilution device 130 in FIG. 4. Referring to FIG. 5, when the flow director 150 is not present in the inlet section 139 of the dilution device 230, the dilution water 104 entering the inlet section 139 from the dilution water inlet 138 immediately contacts the reject slurry 124 passing into the inlet section 139 through the reject slurry inlet 144. This creates the mixing zone 180 positioned immediately adjacent to the reject slurry inlet 144. As shown in FIG. 5, without the flow director 150, the mixing zone 180 is not spaced apart from the reject slurry inlet 144. The incoming dilution water 104 at the dilution water inlet 138 has a velocity vector that is generally horizontal (i.e., perpendicular to the axis A and the +/−Z direction of the cylindrical coordinate axis in FIG. 5). The incoming dilution water 104 has little or no velocity component/vector in the +/−Z direction upon initially entering the inlet section 139. Thus, when the dilution water 104 contacts the reject slurry 124 in the mixing zone 180, the dilution water 104 does not have sufficient velocity in the −Z direction to contribute to conveying the reject slurry 124 further downstream into the cyclonic flow section 140. Without a velocity component in the −Z direction for the dilution water 104, the turbulent mixing in the mixing zone 180 may cause at least some of the dilution water 104 and solid debris and/or contaminants to flow back through the reject slurry inlet 144 and into the cleaner 110, where the solid debris and/or contaminants can possibly enter the reverse flow of the accepted slurry 122. This can reduce the separation efficiency of the cleaner system 100 compared to the dilution device 130 in FIG. 4.

Figure 6:
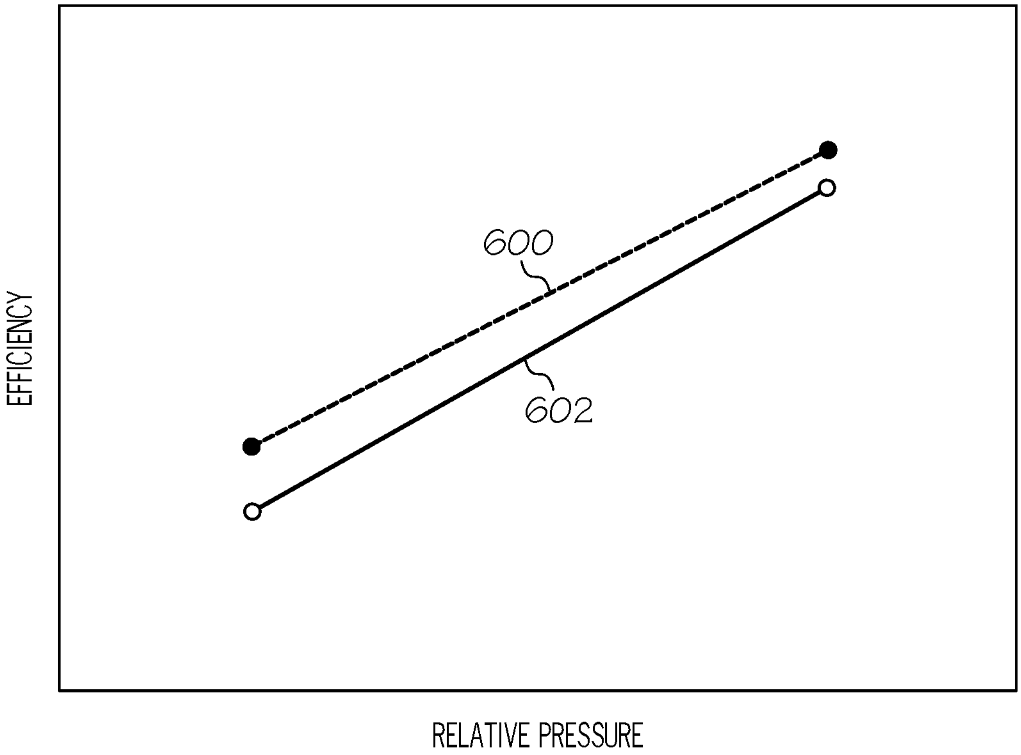
FIG. 6 graphically depicts an efficiency (y-axis) as a function of relative pressure (x-axis) of the cleaner system of FIG. 1 for removing sand particles from a slurry, according to one or more embodiments shown and described herein.

Referring now to FIG. 6, the separation efficiency (y-axis) as a function of relative pressure (x-axis) is graphically depicted for removal of sand particles from a fiber slurry for the cleaner system 100 with the dilution device 130 of FIG. 4 (ref. no. 600) and for the cleaner system 100 with the dilution device 230 of FIG. 5 (ref. no. 602). As shown in FIG. 6, the dilution device 130 of FIG. 4 having the flow director 150 (ref. no. 600) results in a greater separation efficiency for removing sand particles from a fiber slurry compared to the dilution device 230 of FIG. 5 that does not include the flow director 150. The flow director 150 may increase the efficiency by reducing re-entrainment of solid debris and/or contaminants and passage of the solid debris and/or contaminants back into the cleaner 110. Referring again to FIG. 4, additionally, the presence of the flow director 150 may further increase the hydrocyclonic separation of lighter acceptable fibers from the reject slurry 124. In the cyclonic flow section 140, these lighter acceptable fibers may migrate towards the center axis A of the dilution water hydrocyclone 132 and may combine with the core flow 168 to flow back into the accepted slurry 122. This may increase the yield of the accepted slurry 122 from the cleaner system 100, further improving the efficiency.

Figure 7:
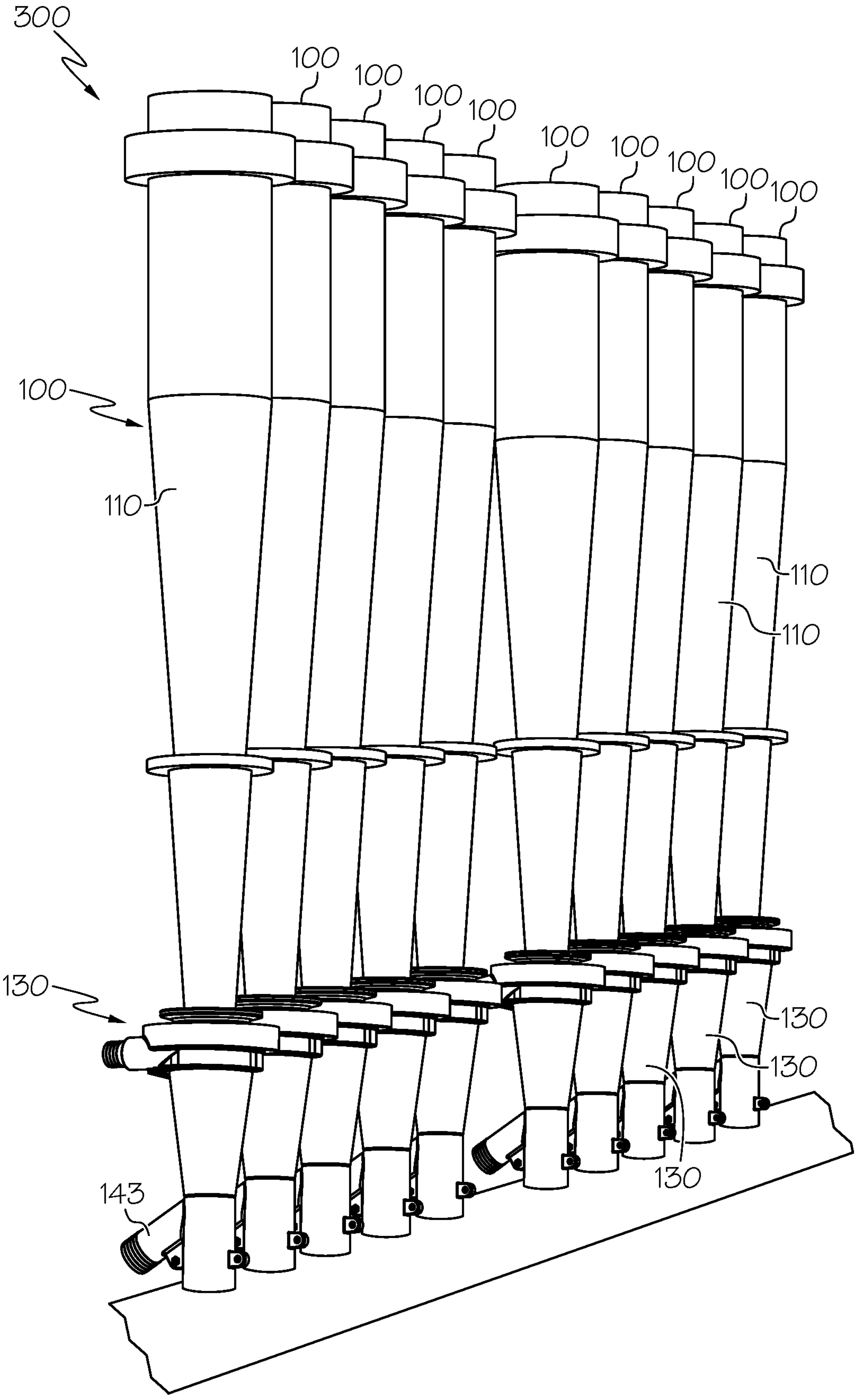
FIG. 7 schematically depicts a cleaner system including a plurality of cleaners and a plurality of dilution devices, according to one or more embodiments shown and described herein.

Referring now to FIG. 7, in one or more embodiments, the cleaner system 100 may be incorporated into a cleaner system assembly 300 comprising a plurality of cleaner systems 100 operated in parallel. The cleaner system assembly 300 may include a plurality of cleaners 110 and a plurality of dilution devices 130, in which each of the dilution devices 130 is fluidly coupled to the reject outlet 118 of one of the cleaners 110.

Referring to FIGS. 1 and 2, a method of removing solid debris and contaminants from a feed slurry 102 may include introducing the feed slurry 102 to the cleaner 110 operable to produce a cyclonic flow that separates the feed slurry 102 into a reject slurry 124 and an accepted slurry 122. The reject slurry 124 may include at least a portion of the solid debris and contaminants from the feed slurry 102. The cleaner 110 may have any of the features previously described herein for the cleaner 110. The method may further include passing the reject slurry 124 to the dilution water hydrocyclone 132 fluidly coupled to the reject outlet 118 of the cleaner 110. The dilution water hydrocyclone 132 may have any of the features of the dilution water hydrocyclone 132 previously discussed herein. For example, the dilution water hydrocyclone 132 may include the cyclonic flow section 140, the dilution water inlet 138 disposed upstream of the upstream end of the cyclonic flow section 140, the reject slurry inlet 144 disposed upstream of the upstream end of the cyclonic flow section 140, the underflow outlet 142 at the downstream end of the cyclonic flow section 140, and the flow director 150 disposed between the reject slurry inlet 144 and the dilution water inlet 138. The method may further include introducing dilution water 104 to the dilution water hydrocyclone 132 through the dilution water inlet 138. The dilution water inlet 138 may be positioned to introduce the dilution water 104 into the side of the dilution water hydrocyclone 132. Introducing the dilution water may cause the dilution water 104 to establish a cyclonic flow in the annular flow region 166 defined between the flow director 150 and the inner surface 135 of the body 134 of the dilution water hydrocyclone 132. The method may further include contacting the dilution water 104 with the reject slurry 124 at the outlet end 158 of the flow director 150. Contacting the dilution water 104 with the reject slurry 124 may cause at least a portion of the dilution water 104 to mix with the reject slurry 124 to reduce or prevent plugging of the cleaner 110, the dilution device 130, or both.

In embodiments, the method may further include recovering the accepted slurry 122 from the overflow outlet 116 of the cleaner 110. Recovering the accepted slurry 122 may include passing the accepted slurry 122 out of an overflow outlet 116 of the cleaner 110. In embodiments, the method may further include recovering the diluted reject slurry 170 from underflow outlet 142 of the dilution water hydrocyclone 132. Recovering the diluted reject slurry 170 may include passing the diluted reject slurry 170 out of the underflow outlet 142 and, optionally, out of the discharge conduit 143 fluidly coupled to the underflow outlet 142.

In embodiments, the method may include introducing the dilution water 104 to the dilution water hydrocyclone 132 in a direction that produces cyclonic flow of the dilution water 104 having an angular direction opposite an angular direction of a cyclonic flow of the reject slurry 124. In embodiments, the method may include introducing the dilution water 104 generally horizontally into the dilution water hydrocyclone 132. Introducing the dilution water 104 horizontally into the dilution water hydrocyclone 132 may include introducing the dilution water 104 tangentially, radially, or at a horizontal angle between zero degrees and 90 degrees relative to a radial line extending radially outward from the center axis A. In embodiments, the method may include introducing the dilution water 104 tangentially to the dilution water hydrocyclone 132. In embodiments, the method may include introducing the dilution water 104 at an angle relative to a plane tangent to the body 134 of the dilution water hydrocyclone 132. The reject slurry may have a consistency of less than or equal to 6% solids. In embodiments, a ratio of a flow rate of the dilution water 104 introduced to the dilution water hydrocyclone 132 and a flow rate of the reject slurry 124 introduced to the dilution water hydrocyclone 132 may be from 0.45:1 to 1.55:1, from 0.75:1 to 1.25:1, or about 1:1. In embodiments, the method may include combining the dilution water 104 having an axial velocity $V_D$ with the reject slurry 124 having an axial velocity of $V_R$, wherein a ratio of $V_D$ divided by $V_R$ is from 0.25 to 0.75.

In embodiments, the feed slurry 102 may comprise a fiber slurry. In embodiments, feed slurry 102 may be a fiber slurry, and the method may include passing the accepted slurry to a paper-making process. In embodiments, the cleaner 110 may be a reverse flow hydrocyclonic cleaner. The method may further include restricting flow between the dilution water inlet 138 and the reject slurry inlet 144. Restricting the flow may reduce the flow of solid debris and/or contaminants back into the cleaner 110.

A first aspect of the present disclosure may be directed to a cleaner system for removing solid debris and contaminants from a feed slurry. The cleaner system may include a cleaner operable to separate a feed slurry into an accepted slurry and a reject slurry, the reject slurry comprising at least a portion of the solid debris and contaminants from the feed slurry. The cleaner system may also include a dilution device disposed downstream of the cleaner and fluidly coupled to a reject outlet of the cleaner. The dilution device may include a dilution water hydrocyclone comprising a dilution water inlet, a cyclonic flow section downstream of the dilution water inlet and having an upstream end and a downstream end, an underflow outlet disposed at the downstream end of the cyclonic flow section, a reject slurry inlet disposed in a top of the dilution water hydrocyclone and coupled to a reject slurry outlet of the cleaner, and a flow director disposed between the dilution water inlet and the reject slurry inlet. The flow director may be operable to direct the flow of dilution water from the dilution water inlet in at least an axial direction towards the cyclonic flow section.

A second aspect of the present disclosure may include the first aspect, in which the flow director may be disposed radially between the dilution water inlet and the reject slurry inlet.

A third aspect of the present disclosure may include either one of the first or second aspects, wherein the flow director may at least partially restrict flow of the dilution water from the dilution water inlet in an axial direction towards the reject slurry inlet.

A fourth aspect of the present disclosure may include any one of the first through third aspects, wherein the flow director may comprise a hollow tube having an inlet end coupled to the dilution water hydrocyclone proximate the reject slurry inlet and an outlet end, wherein the hollow tube may extend from the reject slurry inlet axially towards the cyclonic flow section.

A fifth aspect of the present disclosure may include the fourth aspect, wherein the inlet end of the hollow tube may circumscribe the reject slurry inlet.

A sixth aspect of the present disclosure may include either one of the fourth or fifth aspects, wherein the outlet end of the flow director may be disposed within an inlet section of dilution water hydrocyclone.

A seventh aspect of the present disclosure may include any one of the fourth through sixth aspects, wherein the flow director may be a cylindrical hollow tube.

An eighth aspect of the present disclosure may include any one of the fourth through sixth aspects, wherein the flow director may be a frustoconical hollow tube.

A ninth aspect of the present disclosure may include any one of the fourth through eighth aspects, wherein the outlet end of the flow director may have an inner dimension greater than an inner dimension of the inlet end of the flow director.

A tenth aspect of the present disclosure may include any one of the first through ninth aspects, wherein the outlet end of the flow director may comprise a flat axial surface.

An eleventh aspect of the present disclosure may include any one of the first through tenth aspects, wherein the flow director may comprise a plurality of openings extending through the flow director from an outer surface of the flow director to an inner surface of the flow director.

A twelfth aspect of the present disclosure may include any one of the first through eleventh aspects, wherein the flow director may comprise one or a plurality of anti-rotation tabs coupled to an inner surface of the hollow tube.

A thirteenth aspect of the present disclosure may include any one of the first through twelfth aspects, wherein the cyclonic flow section may comprise a cylindrical section.

A fourteenth aspect of the present disclosure may include any one of the first through thirteenth aspects, wherein the cyclonic flow section may be a tapered section having a frustoconical shape, wherein the downstream end may have an inner dimension that is less than an inner dimension of the upstream end.

A fifteenth aspect of the present disclosure may include any one of the first through fourteenth aspects, wherein the dilution water hydrocyclone may comprise an inlet section defined between the reject slurry inlet and the cyclonic flow section and the flow director may have an axial length that is greater than or equal to 50% of an axial length of the inlet section.

A sixteenth aspect of the present disclosure may include any one of the first through fifteenth aspects, wherein the flow director and a body of the dilution water hydrocyclone may define an annular flow region disposed between the flow director and the body, and wherein the dilution water inlet may be in fluid communication with the annular flow region.

A seventeenth aspect of the present disclosure may include any one of the first through sixteenth aspects, wherein the dilution water hydrocyclone may comprise an inlet section axially disposed between the cyclonic flow section and the reject inlet.

An eighteenth aspect of the present disclosure may include any one of the first through seventeenth aspects, wherein a centerline of the flow director may be congruent with a centerline of the dilution water hydrocyclone.

A nineteenth aspect of the present disclosure may include any one of the first through eighteenth aspects, wherein the dilution water inlet is disposed in a side of the dilution water hydrocyclone. The dilution water inlet may be tangent to the body of the dilution water hydrocyclone, may be radial relative to the body of the dilution water hydrocyclone, or may be disposed at a horizontal angle of from greater than zero degrees to less than 90 degrees relative to a radial line extending radially outward from the center axis of the dilution water hydrocyclone.

A twentieth aspect of the present disclosure may include any one of the first through nineteenth aspects, wherein the cleaner may comprise a reverse-flow hydrocyclonic cleaner.

A twenty-first aspect of the present disclosure may include any one of the first through twentieth aspects, wherein the cleaner comprises a hydrocyclonic cleaner comprising a slurry inlet, a tapered section, an overflow outlet proximate a wide end of the tapered section, and a reject outlet downstream of a narrow end of the tapered section, wherein the hydrocyclonic cleaner is operable to produce a cyclonic flow that separates a feed slurry into a reject slurry at the reject outlet and an accepted slurry at the overflow outlet, the reject slurry comprising solid debris, contaminants, or both.

A twenty-second aspect of the present disclosure may be directed to a cleaner system assembly that may comprise a plurality of the cleaner systems according to any one of the first through twenty-first aspects, where the plurality of cleaners systems may be operated in parallel.

A twenty-third aspect of the present disclosure may include the twenty-second aspect, wherein the plurality of cleaner systems may comprise a plurality of cleaners and a plurality of dilution devices, wherein each of the dilution devices is coupled to a reject outlet of one of the cleaners.

A twenty-fourth aspect of the present disclosure may be directed to a method of removing solid debris and contaminants from a feed slurry. The method may include introducing the feed slurry to a cleaner operable to produce a cyclonic flow that separates the feed slurry into a reject slurry and an accepted slurry, where the reject slurry may include at least a portion of the solid debris and contaminants. The method may further include passing the reject slurry to a dilution water hydrocyclone fluidly coupled to a reject outlet of the cleaner. The dilution water hydrocyclone may comprise a cyclonic flow section, a dilution water inlet upstream of an upstream end of the cyclonic flow section, a reject slurry inlet upstream of the upstream end of the cyclonic flow section, an underflow outlet at a downstream end of the cyclonic flow section, and a flow director disposed between the reject slurry inlet and the dilution water inlet. The method may further include introducing dilution water to the dilution water hydrocyclone through the dilution water inlet. Introducing the dilution water to the dilution water hydrocyclone may cause the dilution water to establish a cyclonic flow in an annular flow region defined between the flow director and an inner surface of the dilution water hydrocyclone. The method may further include contacting the dilution water with the reject slurry at an outlet end of the flow director. Contacting the dilution water with the reject slurry may cause at least a portion of the dilution water to mix with the reject slurry to reduce or prevent plugging of the cleaner, the dilution device, or both.

A twenty-fifth aspect of the present disclosure may include the twenty-fourth aspect, further comprising recovering an accepted slurry from an overflow outlet of the cleaner.

A twenty-sixth aspect of the present disclosure may include either one of the twenty-fourth or twenty-fifth aspects, further comprising recovering a diluted reject slurry from the underflow outlet of the dilution water hydrocyclone.

A twenty-seventh aspect of the present disclosure may include any one of the twenty-fourth through twenty-sixth aspects, comprising introducing the dilution water into the side of the dilution water hydrocyclone. The dilution water may be introduced tangentially, radially, or at a horizontal angle of from greater than zero degrees to less than 90 degrees relative to a radial line extending radially outward from the center axis of the dilution water hydrocyclone.

A twenty-eighth aspect of the present disclosure may include any one of the twenty-fourth through twenty-seventh aspects, comprising introducing the dilution water to the dilution water hydrocyclone in a direction that produces cyclonic flow of the dilution water having an angular direction opposite an angular direction of a cyclonic flow of the reject slurry.

A twenty-ninth aspect of the present disclosure may include any one of the twenty-fourth through twenty-eighth aspects, wherein the reject slurry may have a consistency of less than or equal to 6%.

A thirtieth aspect of the present disclosure may include any one of the twenty-fourth through twenty-ninth aspects, wherein a ratio of a flow rate of the dilution water to a flow rate of the reject slurry introduced to the dilution water hydrocyclone may be from 0.45:1 to 1.55:1.

A thirty-first aspect of the present disclosure may include any one of the twenty-fourth through thirtieth aspects, comprising combining the dilution water having an axial velocity $V_D$ with the reject slurry having an axial velocity of $V_R$, wherein a ratio of $V_D$ divided by $V_R$ is from 0.25 to 0.75, wherein the axial velocity refers to the magnitude of the velocity vector in the axial direction.

A thirty-second aspect of the present disclosure may include any one of the twenty-fourth through thirty-first aspects, wherein the feed slurry may comprise a fiber slurry.

A thirty-third aspect of the present disclosure may include any one of the twenty-fourth through thirty-second aspects, further comprising passing the accepted slurry to a papermaking process.

A thirty-fourth aspect of the present disclosure may include any one of the twenty-fourth through thirty-third aspects, wherein the cleaner may be a reverse-flow hydrocyclonic cleaner.

A thirty-fifth aspect of the present disclosure may include any one of the twenty-fourth through thirty-fourth aspects, further comprising restricting flow of dilution water between the dilution water inlet and the reject slurry inlet, wherein restricting flow may reduce the flow of solid debris and contaminants back into the cleaner.

While various embodiments of the dilution device and cleaner systems comprising the dilution device have been described herein, it should be understood that it is contemplated that each of these embodiments and techniques may be used separately or in conjunction with one or more embodiments and techniques. It will be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

What is claimed is:

1. A cleaner system for removing solid debris and contaminants from a feed slurry, the cleaner system comprising:
   a cleaner operable to separate a feed slurry into an accepted slurry and a reject slurry, the reject slurry comprising at least a portion of the solid debris and contaminants from the feed slurry; and
   a dilution device disposed downstream of the cleaner and fluidly coupled to a reject outlet of the cleaner, the dilution device comprising a dilution water hydrocyclone comprising:
      a dilution water inlet;
      a cyclonic flow section downstream of the dilution water inlet, the cyclonic flow section having an upstream end and a downstream end, wherein the cyclonic flow section is tapered so that an inner dimension at the upstream end is greater than an inner dimension at the downstream end;
      an underflow outlet disposed at the downstream end of the cyclonic flow section;
      a reject slurry inlet disposed in a top of the dilution water hydrocyclone and coupled to a reject slurry outlet of the cleaner; and
      a flow director, disposed between the dilution water inlet and the reject slurry inlet, the flow director operable to direct the flow of dilution water from the dilution water inlet in at least an axial direction towards the cyclonic flow section, wherein the flow director restricts flow of the dilution water from the dilution water inlet in an axial direction towards the reject slurry inlet, wherein the flow director is a hollow tube comprising a continuous wall.

2. The cleaner system of claim 1, wherein the flow director is disposed radially between the dilution water inlet and the reject slurry inlet, and the flow director at least partially restricts flow of the dilution water from the dilution water inlet in an axial direction towards the reject slurry inlet.

3. The cleaner system of claim 1, wherein the flow director has an inlet end coupled to the dilution water hydrocyclone proximate the reject slurry inlet and an outlet end, wherein the inlet end of the flow director circumscribes the reject slurry inlet and the flow director extends from the reject slurry inlet axially towards the cyclonic flow section.

4. The cleaner system of claim 3, wherein the outlet end of the flow director is disposed within an inlet section of the dilution water hydrocyclone.

5. The cleaner system of claim 1, wherein the outlet end of the flow director comprises a flat axial surface.

6. The cleaner system of claim 1, wherein the dilution water hydrocyclone comprises an inlet section defined between the reject slurry inlet and the cyclonic flow section, and the flow director has an axial length that is greater than or equal to 50% of an axial length of the inlet section.

7. The cleaner system of claim 1, wherein the flow director and a body of the dilution water hydrocyclone define an annular flow region disposed between the flow director and the body, and wherein the dilution water inlet is in fluid communication with the annular flow region.

8. The cleaner system of claim 1, wherein the cleaner comprises a reverse-flow hydrocyclonic cleaner.

9. The cleaner system of claim 1, wherein the cleaner comprises a hydrocyclonic cleaner comprising a slurry inlet, a tapered section, an overflow outlet proximate a wide end of the tapered section, and a reject outlet downstream of a narrow end of the tapered section, wherein the hydrocyclonic cleaner is operable to produce a cyclonic flow that separates a feed slurry into a reject slurry at the reject outlet and an accepted slurry at the overflow outlet, the reject slurry comprising solid debris, contaminants, or both.

10. A cleaner system assembly comprising a plurality of the cleaner systems according to claim 1, wherein the plurality of cleaners systems are operated in parallel.

11. A method of removing solid debris and contaminants from a feed slurry, the method comprising:
   introducing the feed slurry to the cleaner system of claim 1 operable to produce a cyclonic flow that separates the feed slurry into a reject slurry and an accepted slurry, the reject slurry comprising at least a portion of the solid debris and contaminants;
   passing the reject slurry to a dilution water hydrocyclone fluidly coupled to a reject outlet of the cleaner system of claim 1, the dilution water hydrocyclone comprising a cyclonic flow section, a dilution water inlet upstream of an upstream end of the cyclonic flow section, a reject slurry inlet upstream of the upstream end of the cyclonic flow section, an underflow outlet at a downstream end of the cyclonic flow section, and a flow director disposed between the reject slurry inlet and the dilution water inlet, wherein the cyclonic flow section is tapered so that an inner dimension at the upstream end is greater than an inner dimension at the downstream end;
   introducing dilution water to the dilution water hydrocyclone through the dilution water inlet, wherein introducing the dilution water causes the dilution water to establish a cyclonic flow in an annular flow region defined between the flow director and an inner surface of the dilution water hydrocyclone; and
   contacting the dilution water with the reject slurry at an outlet end of the flow director, wherein contacting the dilution water with the reject slurry causes at least a portion of the dilution water to mix with the reject slurry to reduce or prevent plugging of the cleaner, the dilution device, or both.

12. The method of claim 11, further comprising recovering an accepted slurry from an overflow outlet of the cleaner and recovering a diluted reject slurry from the underflow outlet of the dilution water hydrocyclone.

13. The method of claim 11, comprising introducing the dilution water into the side of the dilution water hydrocyclone.

14. The method of claim 11, comprising introducing the dilution water to the dilution water hydrocyclone in a direction that produces cyclonic flow of the dilution water having an angular direction opposite an angular direction of a cyclonic flow of the reject slurry.

15. The method of claim 11, comprising combining the dilution water having an axial velocity $V_D$ with the reject slurry having an axial velocity of $V_R$, wherein a ratio of $V_D$ divided by $V_R$ is from 0.25 to 0.75, wherein the axial velocity refers to the magnitude of the velocity vector in the axial direction.

16. The method of claim 11, further comprising restricting flow of dilution water between the dilution water inlet and the reject slurry inlet, wherein restricting flow reduces the flow of solid debris and contaminants back into the cleaner system of claim 1.

17. The method of claim 11, wherein the feed slurry comprises a fiber slurry and the method further comprises passing the accepted slurry to a paper-making process.

18. The cleaner system of claim 1, wherein the flow director comprises one or a plurality of anti-rotation tabs coupled to an inner surface of the hollow tube.

19. The cleaner system of claim 1, wherein the cyclonic flow section is a tapered section having a frustoconical shape, wherein the downstream end has an inner dimension that is less than an inner dimension of the upstream end.

20. The cleaner system of claim 1, wherein the flow director may be cylindrical.

* * * * *